April 9, 1968      E. B. BISCOW      3,377,117
REAR VIEW MIRROR ASSEMBLY INCLUDING A SLEEVE HAVING AN INTERNAL
SPRING TO RESTORE THE REFLECTOR TO A GIVEN POSITION
Filed Oct. 28, 1963      5 Sheets-Sheet 1
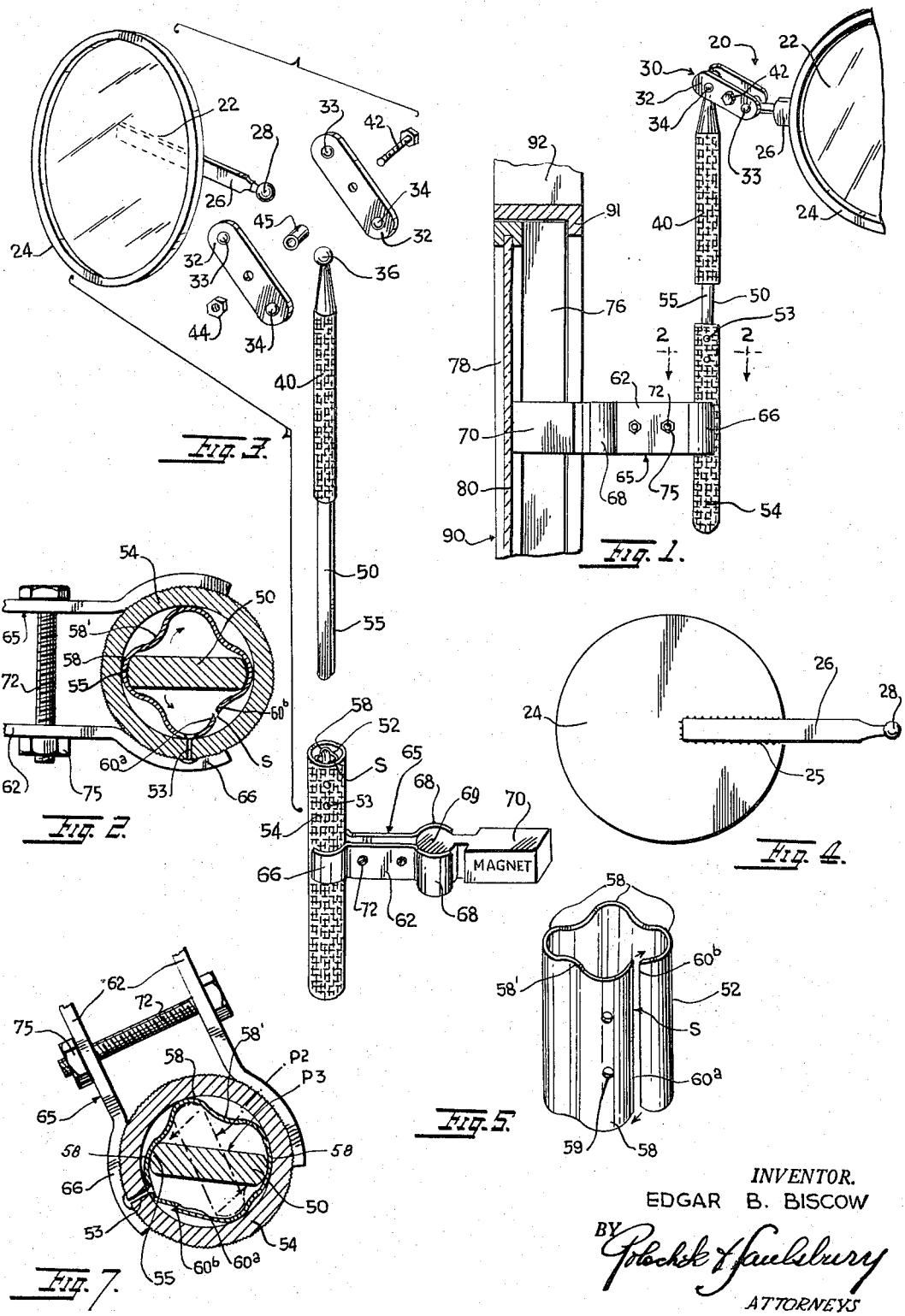
INVENTOR.
EDGAR B. BISCOW April 9, 1968   E. B. BISCOW   3,377,117
REAR VIEW MIRROR ASSEMBLY INCLUDING A SLEEVE HAVING AN INTERNAL
SPRING TO RESTORE THE REFLECTOR TO A GIVEN POSITION
Filed Oct. 28, 1963   5 Sheets-Sheet 2
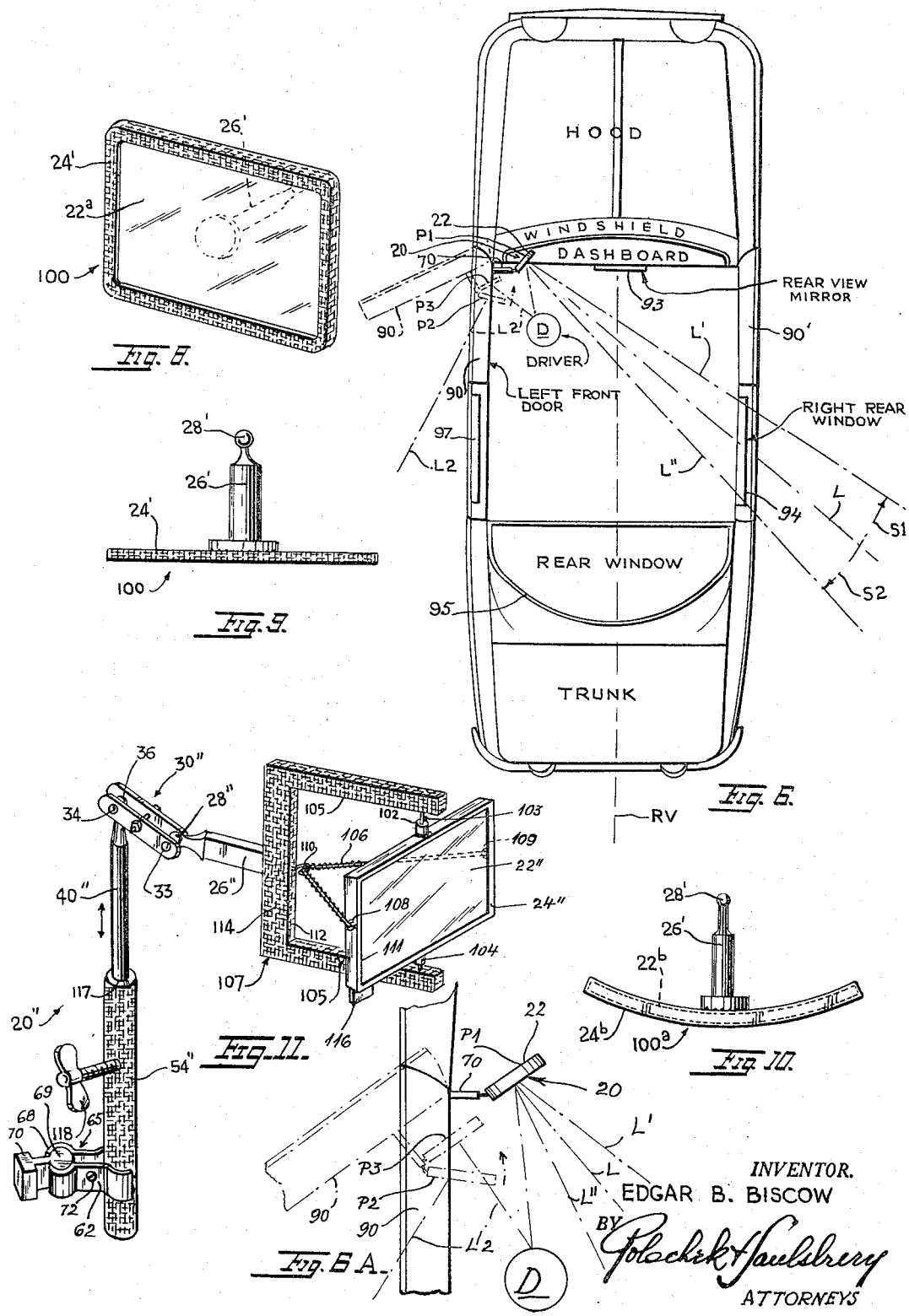
INVENTOR.
EDGAR B. BISCOW
BY Polachek & Saulsbery
ATTORNEYS April 9, 1968      E. B. BISCOW      3,377,117
REAR VIEW MIRROR ASSEMBLY INCLUDING A SLEEVE HAVING AN INTERNAL
SPRING TO RESTORE THE REFLECTOR TO A GIVEN POSITION
Filed Oct. 28, 1963      5 Sheets-Sheet 3

INVENTOR.
EDGAR B. BISCOW
BY
*ATTORNEYS*

April 9, 1968 E. B. BISCOW 3,377,117
REAR VIEW MIRROR ASSEMBLY INCLUDING A SLEEVE HAVING AN INTERNAL
SPRING TO RESTORE THE REFLECTOR TO A GIVEN POSITION
Filed Oct. 28, 1963 5 Sheets-Sheet 4

INVENTOR.
Edgar B. Biscow
BY Polachek & Saulsbury
ATTORNEYS.

April 9, 1968 E. B. BISCOW 3,377,117
REAR VIEW MIRROR ASSEMBLY INCLUDING A SLEEVE HAVING AN INTERNAL
SPRING TO RESTORE THE REFLECTOR TO A GIVEN POSITION
Filed Oct. 28, 1963 5 Sheets-Sheet 
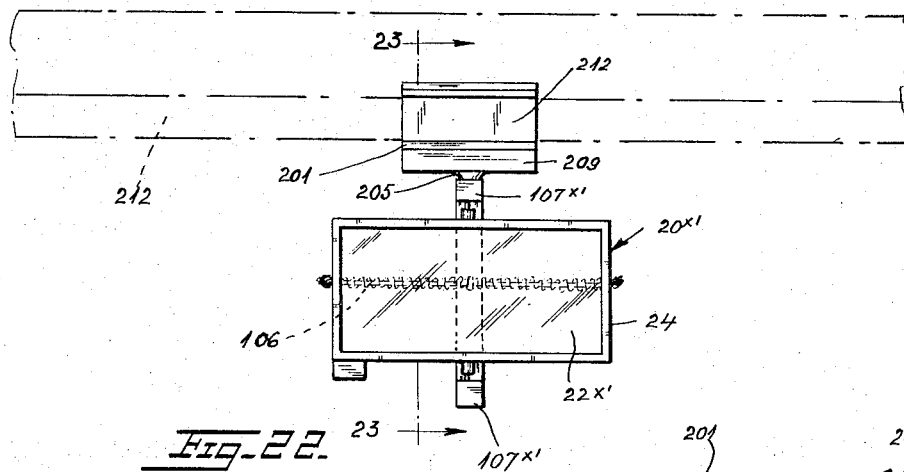
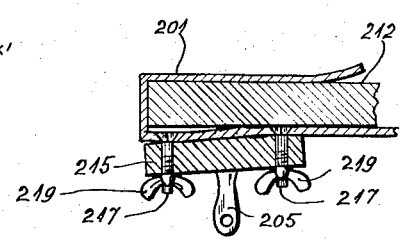
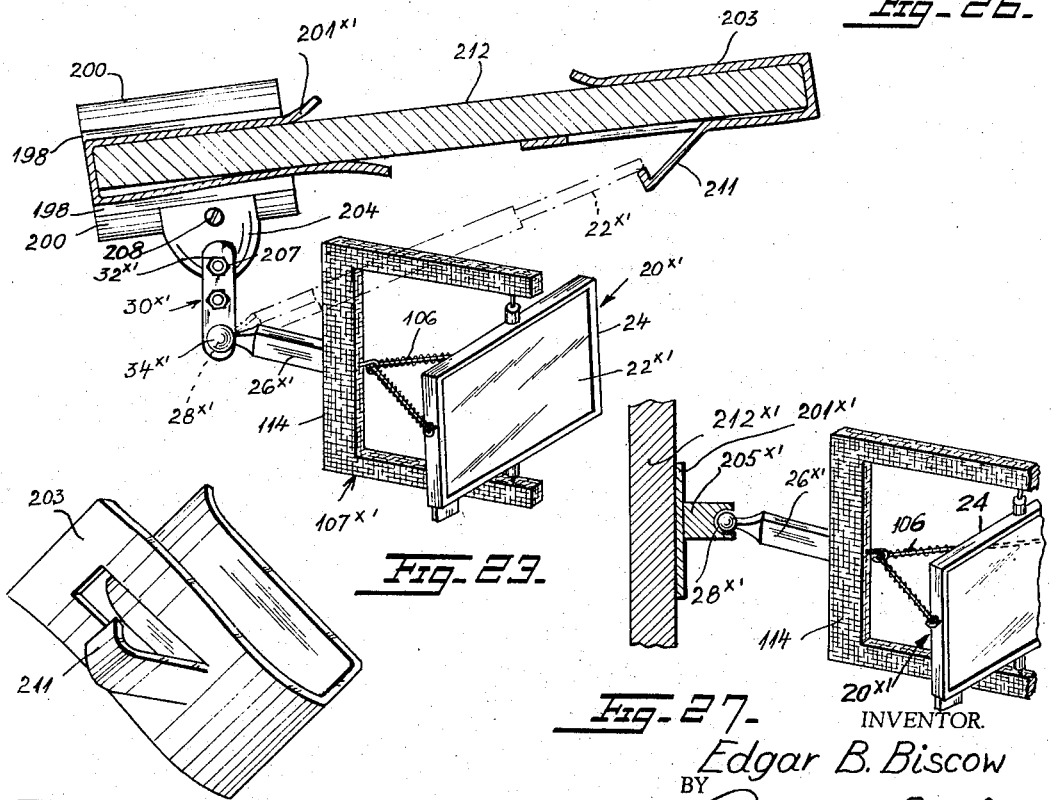
INVENTOR.
Edgar B. Biscow
BY
Polachek & Saulsbury
ATTORNEYS.

United States Patent Office 3,377,117
Patented Apr. 9, 1968

3,377,117
REAR VIEW MIRROR ASSEMBLY INCLUDING A SLEEVE HAVING AN INTERNAL SPRING TO RESTORE THE REFLECTOR TO A GIVEN POSITION
Edgar B. Biscow, 67 Flower Road, Valley Stream, N.Y. 11581
Filed Oct. 28, 1963, Ser. No. 319,364
6 Claims. (Cl. 350—97)

ABSTRACT OF THE DISCLOSURE

A rear view mirror assembly for eliminating blind view areas at opposite sides of an automobile. The mirror assembly is mounted on one side of the automobile. A vertical post adjustably supports the mirror in one position to provide a view along an oblique rear line of sight through a rear window at one side of the automobile, said post adapted to be manually rotated to set the mirror in a further moved position to provide a view along another oblique rear line of sight, said post being adapted to be automatically rotated in a direction to restore the mirror to its original position when pressure on the post is released.

---

This invention concerns a rear view mirror assembly especially adapted for mounting in an automobile for presenting a view through the right or left rear windows of the automobile.

According to the invention, the mirror assembly may be mounted on the left front door of an automobile to provide a view through the right rear window. When the door is opened the mirror provides a rear view at the left side of the automobile of approaching vehicles. The assembly includes a bracket having a universal or double joint mounting for a mirror. The bracket includes telescopic parts which are spring loaded so that the mirror can be swung angularly to different positions. In some angular positions the mirror will remain where placed. In other angular positions the mirror will remain only while the bracket is held manually and the mirror will return automatically to a stabilized position when the pressure is released. The mirror may be round, rectangular, oval or of other geometrical shape. The mirror may be flat or curved. A reflective frame may be provided for the mirror. This frame glows or reflects red, yellow or other colored light when a vehicle approaches from the rear to warn the driver of the approaching vehicle. The glow or reflection will increase in intensity as the vehicle nears. The several parts of the bracket may be made of metal or plastic material and the mirror itself may be made of glass or plastic. The assembly may be provided with clamps and/or a magnet for quick mounting on magnetic parts of the automobile.

It is therefore one object of the invention to provide a mirror assembly for an automobile to eliminate rear blind spots.

Another object is to provide an adjustable mirror assembly adaptable for mounting on a door, dashboard, windshield frame, sun visor, rear view mirror or other part of an automobile to hold a mirror in suitable positions for providing rear oblique views of opposite sides of the automobile.

Another object is to provide a mirror assembly as described with spring parts for automatically holding the mirror in a particular position and for returning the mirror to that position if the mirror is momentarily swung away from that position.

Further objects are to provide a rear view mirror assembly with adjustable bracket parts; to provide a reflector frame for the rear view mirror; to provide universal joints for supporting the mirror; to provide a magnet and/or bracket for supporting the assembly; to provide a rear view mirror assembly as an automobile accessory which can be installed in all models of automobiles; to provide a rear view mirror assembly which can be installed without use of any tools and which can be adjusted with simple tools such as a screw driver or wrench.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a fragmentary elevational view of a mirror assembly embodying the invention, the assembly being shown mounted on a door frame of an automobile.

FIG. 2 is a horizontal sectional view on an enlarged scale taken on line 2—2 of FIG. 1.

FIG. 3 is an exploded perspective view of parts of the mirror assembly.

FIG. 4 is a rear elevational view of a mirror.

FIG. 5 is a perspective view of a spring employed in the assembly.

FIG. 6 is a diagrammatic top plan view of an automobile indicating ways in which the mirror assembly may be used.

FIG. 6A is an enlarged detail view showing the open door of FIG. 6.

FIG. 7 is a sectional view similar to FIG. 2 showing one position of adjustment of the bracket parts.

FIG. 8 is a perspective view of a modified form of a mirror which may be used in the mirror assembly.

FIG. 9 is an edgewise plan view of the mirror of FIG. 8.

FIG. 10 is an edgewise plan view of another modified form of mirror structure.

FIG. 11 is a perspective view of another modified form of mirror assembly.

FIG. 22 is a front elevational view of another modified form of mounting for the mirror assembly positioned on a sun visor.

FIG. 23 is an enlarged vertical sectional view taken on line 23—23 of FIG. 22.

FIG. 24 is a perspective view of a bracket shown in FIG. 23.

FIG. 26 is a fragmentary sectional view showing a modified arrangement for fastening the mirror assembly to a sun visor.

FIG. 27 is a part sectional and part elevational view of still another modification.

Figure 12:
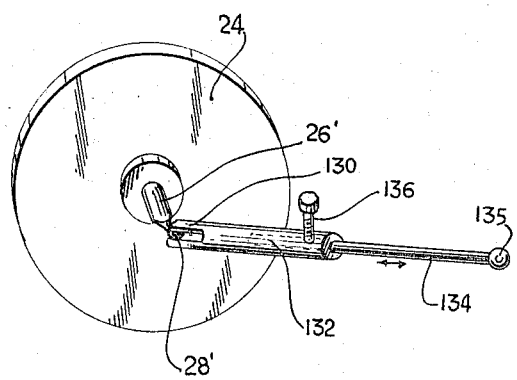
FIG. 12 is a rear perspective view of a modified form of mirror mounting.

Referring first to FIGS. 1–4, there is shown an improved mirror assembly 20 including a round glass or plastic reflector plate or mirror 22. The mirror is supported in a circular metal or plastic frame 24. A metal arm 26 is secured to the back of the mirror frame by welding 25 but may be secured by a universal joint or by other suitable means; see FIG. 4. The arm 26 extends radially outward of the frame and has a ball 28 at its outer free end. A double universal joint clamp unit 30 is provided for adjustably supporting the mirror. This clamp includes two spaced narrow plates 32 having spaced opposing concavities or recesses 33, 34. One pair of recesses 33 receives and engages ball 28. The other pair of recesses 34 engages a ball 36 at the upper end of a post or rod 40. A bolt 42 and nut 44 engaged on the bolt hold the plates 32 together so as to apply pressure to the balls 28 and 36. A sleeve washer 45 may be provided on the shank of the bolt between plates 32 to limit the pressure which may be applied to the balls and plates when the nut and bolt are tightened.

Post 40 is a round cylindrical member with a knurled outer surface. The post has a flattened bottom leg 50 which fits frictionally into a split tubular fluted spring 52. The spring is held by rivets 53 inside an elongated sleeve 54. The post is telescopically held by sleeve 54 since the leg 50 can slide up and down the sleeve in frictional engagement with the spring. Leg 50 has rounded or cylindrically curved opposing edges 55.

Spring 52, as best shown in FIGS. 2 and 5, has four externally convex flutes 58 angularly spaced about 90° apart and alternating with four internally convex flutes 58'. Holes 59 in one flute receive the rivets 53. A longitudinal split or space S is provided in one side of the spring to permit circumferential expansion and contraction of the spring. The rivets 53 are positioned close to the split S. Opposing edges $60^a$, $60^b$ of the spring at the split are beveled in the same direction so that the edges can slide easily past each other; see FIG. 5.

A clamp unit 65 with two opposing clamp plates 62 is provided for supporting the sleeve 54. Plates 62 have circularly curved ends 66 for engaging on knurled outer surface of sleeve 54. The opposite ends 68 of the plates 62 are similarly curved for engaging on cylindrically curved end 69 of a permanent block or bar magnet 70. Bolts 72 pass through aligned holes in plates 62 and are secured by nuts 75 to hold the clamp unit 65 in adjustable engagement with the sleeve 54 and magnet end 69.

FIG. 1 shows the mirror assembly 20 adjustably mounted on the front wall 76 of a front metal window frame 78 at the left side of an automobile. The magnet 70 adheres to the magnetic steel wall of the window frame adjacent to glass pane 80. The window is part of the driver's left front access door 90. As is conventional, this door can be opened outwardly of the stationary door jamb 91 in body 92 of the automobile.

FIG. 6 shows diagrammatically the mirror assembly 20 mounting by magnet 70 on the window frame portion of the left front door 90. The mirror 22 is disposed in position P1 angularly to the fore and aft direction of the automobile. The mirror is so tilted and adjusted on the double universal joint mounting clamp unit 30 and clamp unit 65 that the driver D has a clear view along oblique line L through the right rear window 94. Normally a driver has a clear rear view only on the line of sight RV from rear view mirror 93 through the rear window 95.

The right rear window 94 constitutes a blind spot or area which the driver cannot see. The angular position of mirror 22 makes right rear window 94 and any vehicle or other object outside the window 94 visible to the driver without requiring the movement of the driver's head. If the driver D wishes to momentarily change the line of sight angularly forward to line L' or angularly rearward to line L", he can grasp the knurled rod 40 and can manually turn it slightly. This will cause the flattened leg 50 to press two opposing internally convex flutes 58' of the spring outwardly slightly, to give the driver the desired rear oblique view on lines L' or L". Upon manually releasing the rod 40, the rod and mirror will turn back to the original oblique position P1 providing a view along rear oblique line L.

Suppose now that the driver opens left front door 90. It will be apparent that the entire mirror assembly 20 will move outwardly from the solid line position P1 shown in FIG. 6 to the dotted line position P2. While the mirror is in position P2, the driver has an oblique rear left view on line L2. Then as the driver steps out of the automobile through open door 90, he will still have a rear line of sight on left rear line of sight on left rear line L2 because the driver has now changed his viewing position at the same time that mirror 22 has moved angularly clockwise to position P2. Thus the driver keeps in view the left rear side of the automobile, which is normally otherwise a blind position.

If the driver wishes a view rearwardly and to the right along oblique line L' or L, he will rotate the rod 40 counterclockwise as viewed in FIG. 6 so that the mirror turns to the position P3. The leg 50 will be turned angularly counterclockwise from the dotted line position P3 shown in FIG. 7. Since this position of the leg is midway between two expanded flutes 58 the leg may remain in this position. If the leg is positioned slightly less than midway then the leg will be under a circumferential spring force or load tending to restore the leg to the original position P2.

The invention thus makes is possible to eliminate with one mirror device blind spots to the right rear and left rear of an automobile. The mounting bracket, which includes clamp units 30 and 65, rod 40 and sleeve 54, is fully adjustable in length, and in angular positioning of the clamp units on the sleeve and on the mirror arm. The spring loading provides an automatic return of the mirror to a particular position upon release of pressure on the bracket after slight manual rotation of the mirror away from that position.

In FIGS. 8 and 9 there is shown another mirror structure 100 in which mirror $22^a$ is generally rectangular or oblong in shape. The frame 24' may be made of luminescent plastic material to render the frame visible in the dark, and to reflect the headlights of an automobile approaching from the rear. The mirror structure has arm 26' secured to the back of the mirror frame and extending perpendicularly therefrom. Ball 28' is located on the free outer end of arm 26'. Clamp plates 32 can engage on ball 28' in the same manner as on ball 28 as explained above and illustrated in FIGS. 1 and 3.

In FIG. 10 mirror structure $100^a$ is the same as mirror structure 100 except that mirror $22^b$ is curved and frame $24^b$ is correspondingly curved. The mirror is shown as cylindrically convex. If desired, the mirror could be cylindrically concave or may have a spherical concave or convex curvature. The mirror may have any other desired geometrical shape than round or rectangular.

In FIG. 11 there is shown a modified form of mirror assembly 20' in which parts corresponding to those of assembly 20 are identically numbered. Mirror 22" is mounted in a frame 24". Trunnion sleeves 102, 104 at upper and lower edges of the frame engage trunnion pins 103 carried by legs 105 of a generally U-shaped frame 107. The mirror is pivotable on an axis defined by the aligned pins 103.

A spring 106 is secured at its end to eyes 108 and 109 on the ends of frame 111 and midway its ends to eye 110. Frame 107 can be made of light reflective plastic material or can be coated with reflective paint. Spring 106 exerts a restoring or retracting force to move the mirror back to the plane of frame 24" if the mirror is manually displaced by turning in one direction or the other. A depending tab 116 secured to the bottom of frame 24" facilitates turning the mirror manually.

An arm 26" extends laterally of frame plate 114. A ball 28" on the end of arm 26" engages in the double universal joint clamp unit 30". Ball 36 on the upper end of a post or rod 40" also is engaged by clamp unit 30". The rod is telescopically inserted in bore 117 in sleeve 54". The rod can be fixed in position by tightening a thumb set screw 118 inserted laterally in the sleeve to engage the rod. Clamp unit 65 adjustably engages the sleeve 54" and magnet 70 for mounting in a suitable manner at one side of an automobile body frame, door, dashboard, etc. Although clamp unit 65 is shown extending to the right in FIG. 11, it will be obvious that it can be turned and adjusted to any position necessary to effect proper attachment inside the automobile.

The mirror assembly 20' can be adjusted to provide oblique lines of sight out through the right rear window of the automobile in the same manner as explained with reference to FIG. 6 in connection with mirror assembly 20. In addition, the mirror 22" will provide views to the left and rear of the open door 90. It will also provide views to the left and rear simply by moving mirror frame 24 to angular positions to the left by depressing tab 116 to left in varying degrees.

In FIG. 12, the mirror frame 24 has a mounting arrangement which may be employed in place of the fixed arm 26 of FIGS. 1–4. Ball 28' at the end of arm 26' is engaged by a universal clamp joint 130 at the end of a sleeve 132. Slidably and adjustably disposed in sleeve 132 is a rod 134 having a ball 135 on its end for engagement by clamp unit 30. A set screw 136 in the sleeve is used to secure the rod 134 in place.

Figure 13:
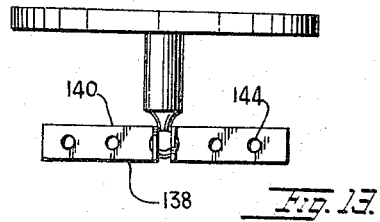
FIG. 13 is a top plan view of another modified form of mirror mounting.

In FIG. 13, a universal clamp unit 138 is formed on the end of an assembly of angle brackets 140. The brackets have holes 144 for receiving screws to mount the mirror frame on any suitable support inside the automobile. This support may be a door frame, window frame, dashboard, sunshade visor, roof, rear view mirror, etc.

Figure 14:
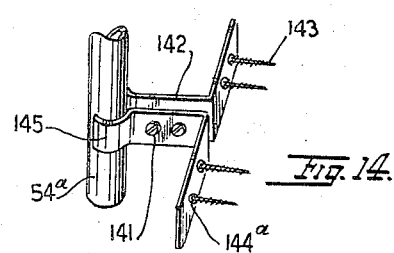
FIG. 14 is a fragmentary perspective view of a modified form of bracket mounting.

In FIG. 14, angle brackets 142 have curved ends 145 engaged on the sleeve 54ᵃ and held by screws 141. Screws 143 in holes 144ᵃ are used to secure the brackets to a suitable support in the automobile.

Figures 15, 16:
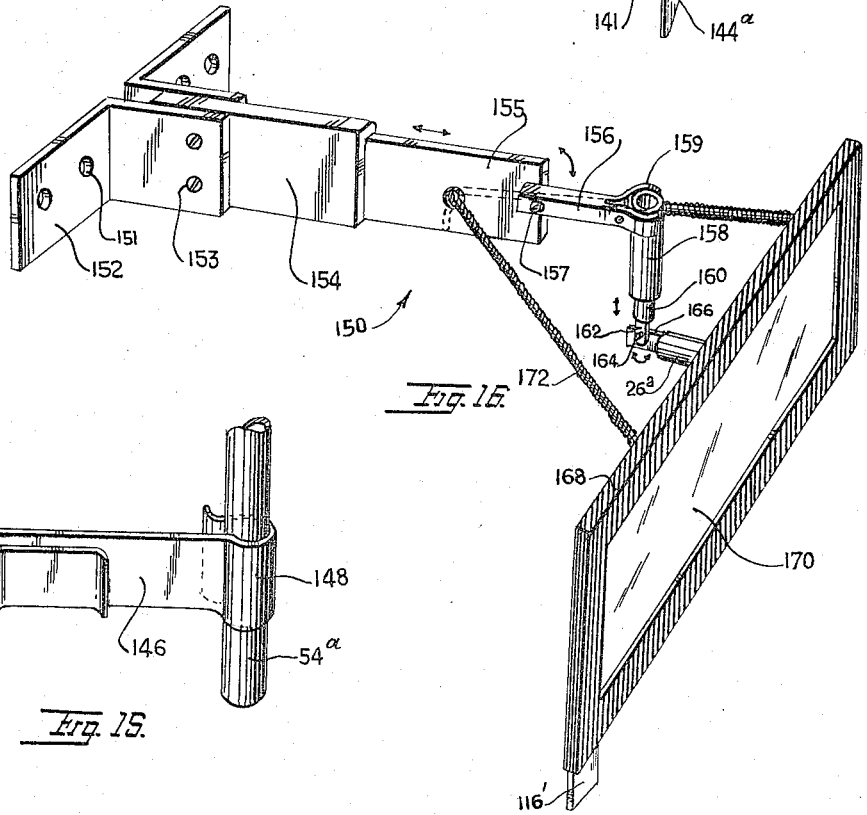
FIG. 15 is a perspective view of a modified form of clip mounting.
FIG. 16 is a perspective view of still another modified form of mirror assembly and bracket mounting.
Figure 17:
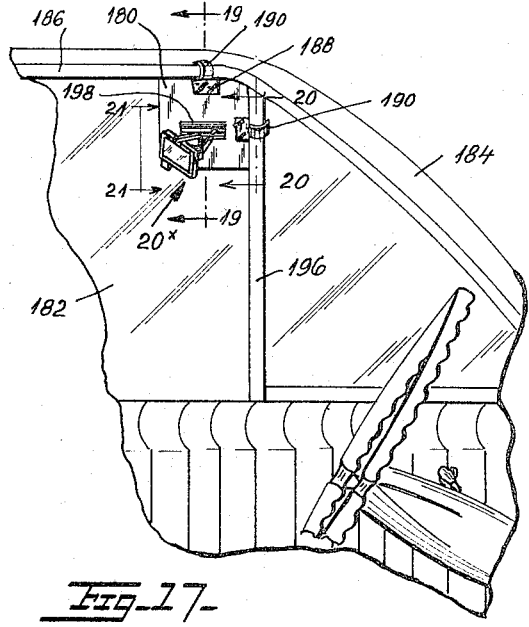
FIG. 17 is a side elevational view of a fragment of the front left door window of an automobile with a mounting plate to which is applied a mirror assembly embodying the invention.
Figure 18:
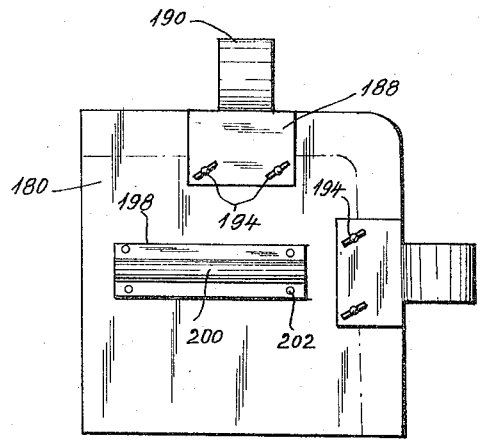
FIG. 18 is a front elevational view of the mounting plate of FIG. 17.
Figure 19:
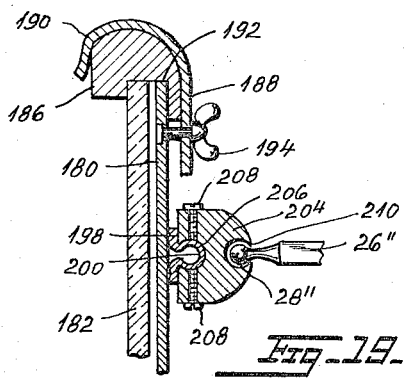
FIG. 19 is an enlarged vertical sectional view taken on the line 19—19 of FIG. 17.

In FIG. 15, there is provided a spring clip 146 having a spring loop 147 at one end which can engage adjustably on a sunshade visor, rear view mirror or other projection in the automobile. The other end of the clip 146 has a spring loop 148 which engages adjustably on the sleeve 54ᵃ.

In FIG. 16 there is shown a mirror assembly 150. Angle brackets 152 have flat sides provided with holes 151 to receive screws for securing the brackets to a suitable support inside the automobile. A hollow rectangular flat tube 154 is secured by screws 153 to the brackets. The tube slidably receives a bar 155 for adjusting the extension of the bar 155. An arm 156 is pivotally mounted on the end of bar 155 and is pivotally adjustable by tightening screw 157.

At the outer end of arm 156 there is a universal spring clamp unit 159 engaging a cylindrical sleeve 158. A post 160 having a flat finger 162 on its end is slidably adjustable in the sleeve 158. Finger 162 is secured by a screw 164 to a finger 166 extending outwardly of arm 26ᵃ at the back of mirror frame 168. The frame 168 carries mirror 170. A spring 172 attached between both ends of the back of the mirror frame and bar 155 turns the mirror on the axis of sleeve 158 when the mirror is deflected manually and pressure is then released. The frame 168 is coated or colored with a reflective substance which glows with a red or other colored light when light from an approaching vehicle falls upon it. Tab 116' facilitates turning the mirror manually.

Referring now to the form of invention shown in FIGS. 17 to 21, inclusive, in this form the mirror assembly 20ˣ is shown mounted on a separate mounting plate 180 on the left front door window frame 182 of an automobile 184. The mounting plate is shown mounted on the top channel-shaped bead 186 along the top of the window frame by means of a bracket having a plate-like rectangular body 188 and an integral curved finger 190 extending from one long edge thereof and looped over the top edge of the bead 186. The top edge of the mounting plate is inserted in the channel 192 of the bead 186 and the bracket is secured to the top of the plate by screw and wing nut assemblies 194. The plate 180 is also releasably secured to the channel-shaped bead 196 extending along the front vertical edge of the window frame by a similar bracket similarly secured.

An elongated plate 198 having a loop portion 200 along the center thereof from end to end is fastened to the plate midway its top and bottom by means of rivets 202. A mirror assembly 20ˣ similar to the mirror assembly 20" shown in FIG. 11 is slidably mounted and connected to the plate 198. This slidable mounting and connection includes a semi-spherical solid metal bearing member 204 formed with a groove 206 across the center of its base or flat portion adapted to receive the loop portion 200 of the plate. The bearing member is secured in adjusted position along the plate 198 by means of opposed set screws 208. The ball 28" of the arm 26" is mounted under tension in a semi-spherical socket 210 in the bearing member so that a universal joint connection is provided for the mirror assembly 20ˣ, providing an arcuate sweep from right rear to left rear.

The mirror assembly 20ˣ on the plate 180 is within easy reach of the driver so that the mirror 22ˣ can be tilted to any desired angle for looking through the right or left rear window.

A plate 198ˣ' with a central loop 200ˣ' is fastened to clip 201 for supporting the mirror assembly 20ˣ' on one side of the clip 201ˣ' on the sun visor 212. Another plate 198ˣ' is similarly fixed to the other side of clip 201ˣ' for mounting the assembly 20ˣ' when the visor is lowered. As an alternative, a plate 215 might be fastened to the clip 201 by means of screws 217 and wing nuts 219 as shown in FIG. 26. This plate 215 is provided with a supporting arm 205 for connection with the clamp unit 30ˣ'. The assembly 20ˣ' is readily removable when the sun visor 212 is tilted down and placed on a different surface.

Furthermore, the assembly 20ˣ' might be connected to the sun visor 212ˣ' by a single universal joint constituted by an arm 205ˣ' connected at one end to the clip 201ˣ' of the sun visor 212ˣ' and having a socket 210ˣ' at its other end receivng ball 28ˣ' on end of arm 26ˣ', as shown in FIG. 27.

The universal joint connection between the arm 26ˣ' and the clamp unit 30ˣ' permits the mirror assembly to be adjusted to all desired angles for looking through the right and left rear windows, providing an arcuate sweep from right to left rear.

When the mirror assembly 20ˣ' is not in use, it can be held out of the way in inoperative position by interlocking the outer end edge of the mirror 22ˣ' with an outstruck hooked lug 211 formed in the clip 203 as shown in dot-dash lines in FIG. 23.

Figure 25:
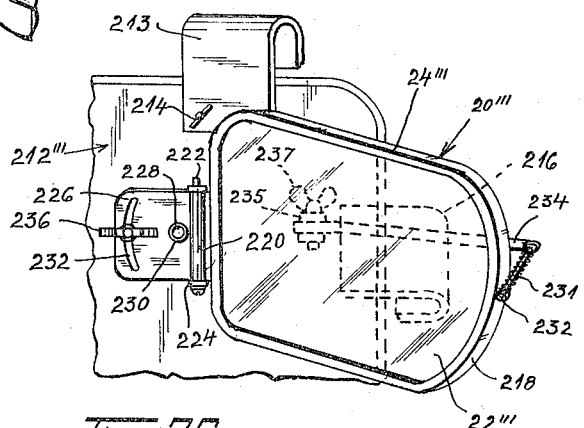
FIG. 25 is a perspective view of still another modified form of mirror assembly adapted to be mounted on the left front door of an automobile.
Figure 21:
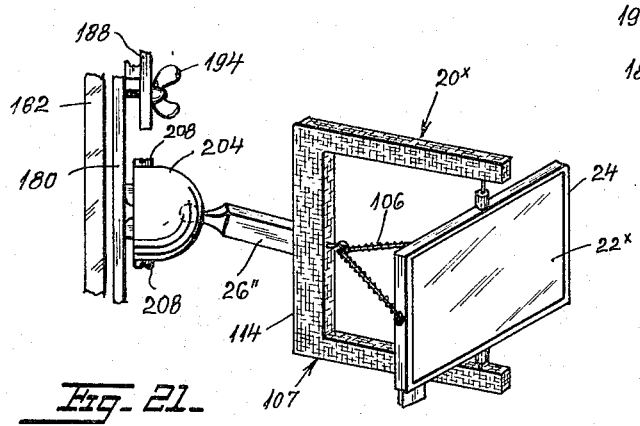
FIG. 21 is an edge view as seen along the line 21—21 of FIG. 17.
Figure 20:
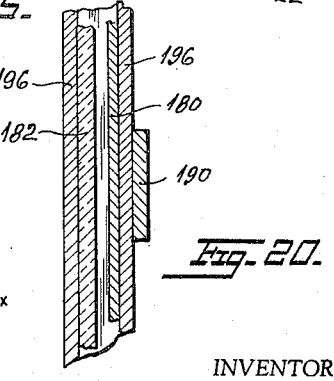
FIG. 20 is an enlarged vertical sectional view taken on the line 20—20 of FIG. 17.

In FIG. 25, there is shown a further modified form of mirror assembly 20''' mounted on a mounting plate 212''. The plate is provided with a top bracket 213 secured thereto by bolt and wing nut assemblies 214 at the top of the plate for hanging the plate on the top of the frame of the window, and the plate is also provided with a similar bracket 216 at the side thereof for mounting on the front end edge of the window frame.

A substantially rectangular-shaped mirror frame 24''' framing a mirror 22''' has one end rounded as indicated at 218. The other end of the frame is straight and carries an elongated sleeve 220 centrally thereof. The sleeve is sleeved around a hinged pin 222 journalled between two upright perforated ears 224 on one end of a rectangular plate 226 pivotally mounted on the plate 212''' centrally thereof by means of a pivot pin 228 extending through a hole 230 in the plate. A curved closed slot 232 is formed in the other end of the plate. The plate 226 is adapted to pivot around the pin 228 in a plane parallel to the plane of the body of the plate, and the mirror frame 24''' and mirror 22''' are adapted to be manually swung in a plane angularly to the plane of the plate and adapted to be retracted automatically to normal angular position by means of a coil spring 231 connected to one end of an eyelet 232 on the rounded free end of the mirror frame and at its other end to one end of a bar 234, the other end of the bar being adjustably connected to a hinge 235 attached to plate 212 and fastened thereto by a wing nut 237. The plate 226 is adapted to be held in pivoted adjusted position by means of a bolt and wing nut assembly 236 extending through the curved slot 232 in the plate.

The mirror frame 24''' and mirror 22''' are manually adapted to be adjusted in a variety of planes and when pressure is released, the spring 230 retracts the assembly to normal angular position as fixed by bar 234.

The invention in any of its various forms as described constitutes an automobile accessory which can be installed in any type of automobile. The mirror assembly can be mounted by the magnet 70 on the right front door frame or on the dashboard. If desired, the mirror assembly can be mounted at the right front side of the passenger compartment to provide a view out of the left rear window 97 as seen in FIG. 6. In some installations, the magnet may be omitted and the assembly can be mounted by clamp units alone as shown in FIGS. 13–16 to any desired part of the automobile. In general, however, it is preferable to mount the assembly on either the left or right front door frame depending on whether the driver is seated at the left side or right side, respectively, of the automobile. If desired, two mirror assemblies may be provided for mounting at both right and left front doors 90, 90', respectively, for providing views out of the left and right rear windows 97, 94, respectively.

It is to be understood that the device may be mounted at any other suitable location within an automobile such as on the sunshade visor, windshield frame, rear view mirror, etc.

While I have illustrated and described the preferred embodiments of my invention, it is to be understood that I do not limit myself to the precise constructions herein disclosed and that various changes and modifications may be made within the scope of the invention as defined in the appended claims.

Having thus described by invention, what I claim as new, and desire to secure by United States Letters Patent is:

1. A rear view mirror assembly for eliminating blind viewing areas at opposite sides of an automobile, comprising a frame, a mirror supported in said frame, a post, a first clamp unit including universal joint means adjustably connecting the frame to the post, a sleeve telescopically receiving said post, said post being rotatable and slidable in said sleeve and being frictionally engaged in the sleeve for remaining in any set position of extension and rotation in the sleeve, a second clamp unit attached to the sleeve for mounting the same in an axially vertical position at one side of the automobile, whereby said mirror may be adjustably positioned to provide a view on an oblique rear line of sight through a rear window at the other side of the automobile, and a spring disposed in said sleeve and provided with means to yieldably engage with said post so that the post can be manually rotated to turn slightly in said sleeve to hold the post in a new position of rotation and to set the mirror in another position to provide a view on another oblique rear line of sight, and whereby the post is urged by said spring to turn oppositely and restore the mirror to its original position when pressure on the post is released.

2. A rear view mirror assembly for eliminating blind viewing areas at opposite sides of an automobile, comprising a frame, a mirror supported in said frame, a post, a first clamp unit including universal joint means adjustably connecting the frame to the post, a sleeve telescopically receiving said post, said sleeve having post-engaging means, said post being rotatable and slidable in said sleeve and being frictionally engaged in said post-engaging means for remaining in any set position of extension and rotation in the sleeve, a second clamp unit attached to the sleeve for mounting the same in an axially vertical position at one side of the automobile, a magnet carried by said second clamp unit for detachable and adjustable engagement with a magnetic support at said one side of the automobile, whereby said mirror may be adjustably set in one position to provide a view along an oblique rear line of sight through a rear window at the other side of the automobile, and a spring disposed in said sleeve and provided with means to yieldably engage with said post so that the post can be manually rotated to turn slightly in said sleeve to hold and to set the mirror in another position to provide a view along another oblique rear line of sight, and whereby the post is urged by said spring to turn oppositely and restore the mirror to its original position when pressure on the post is released.

3. A rear view mirror assembly for eliminating blind viewing areas at opposite sides of an automobile, comprising a frame, a mirror supported in said frame, a post, a first clamp unit including universal joint means adjustably connecting the frame to the post, a sleeve telescopically receiving said post, said post being rotatable and slidable in said sleeve and being frictionally engaged in the sleeve for remaining in any set position of extension and rotation in the sleeve, a second clamp unit attached to the sleeve for mounting the same in an axially vertical position at one side of the automobile, whereby said mirror may be adjustably positioned to provide a view along an oblique rear line of sight through a rear window at the other side of the automobile, said post having a flattened leg extending axially therefrom, and a fluted spring disposed circumferentially in said sleeve, said spring having alternate externally and internally convex flutes and being expansible in circumference, said leg having opposite rounded long edges frictionally engaged with two opposing externally convex flutes so that the post can be moved axially and can be manually rotated to turn in the sleeve, whereby the post can be manually rotated to engage with another two opposing flutes to hold the post in a new position of rotation and set the mirror in another position, and whereby the post can be manually rotated to turn the leg slightly in the sleeve to set the mirror in a further position to provide a view along another oblique rear line of sight, said post being urged by said spring to turn oppositely and restore the mirror to its original position when pressure on the post is released.

4. A rear view mirror assembly for eliminating blind viewing areas at opposite sides of an automobile, comprising a frame, a mirror supported in said frame, a post, a first clamp unit including universal joint means adjustably connecting the frame to the post, a sleeve telescopically receiving said post, said post being rotatable and slidable in said sleeve and being frictionally engaged in the sleeve for remaining in any set position of extension and rotation in the sleeve, a second clamp unit attached to the sleeve for mounting the same in an axially vertical position at one side of the automobile, a magnet carried by said second clamp unit for detachable and adjustable engagement with a magnetic support at said one side of the automobile, whereby said mirror may be adjustably set in one position to provide a view along an oblique rear line of sight through a rear window at the other side of the automobile, said post having a flattened leg extending axially therefrom, and a fluted spring disposed circumferentially in said sleeve, said spring having alternate externally and internally convex flutes and being expansible in circumference, said leg having opposite rounded long edges frictionally engaged with two opposing externally convex flutes so that the post can be moved axially and can be manually rotated to turn in the sleeve, whereby the post can be manually rotated to engage with another two opposing flutes to hold the post in a new position of rotation and set the mirror in another position, and whereby the post can be manually rotated to turn the leg slightly in the sleeve to set the mirror in a further position to provide a view along another oblique rear line of sight, said post being urged by said spring to turn oppositely and restore the mirror to its original position when pressure on the post is released.

5. A rear view mirror assembly for eliminating blind viewing areas at opposite sides of an automobile, comprising a frame, a mirror supported in said frame, a post, a first clamp unit including universal joint means adjustably connecting the frame to the post, a sleeve telescopically receiving said post, said post being rotatable and slidable in said sleeve and being frictionally engaged in the sleeve for remaining in any set position of extension and rotation in the sleeve, a second clamp unit attached to the sleeve for mounting the same in an axially vertical position at one side of the automobile, a magnet carried by said second clamp unit for detachable and adjustable engagement with a magnetic support at said one side of the automobile, whereby said mirror may be adjustably set in one position to provide a view along an oblique rear line of sight through a rear window at the other side of the automobile, said post having a flattened leg extending axially therefrom, and a fluted spring disposed circumferentially in said sleeve, said spring having alternate externally and internally convex flutes and being expansible in circumference, said leg having opposite rounded long edges frictionally engaged with two opposing externally convex flutes so that the post can be moved axially and can be manually rotated to turn in the sleeve, whereby the post can be manually rotated to engage with another two opposing flutes to hold the post in a new position of rotation and set the mirror in another position, and whereby the post can be manually rotated to turn the leg slightly in the sleeve to set the mirror in a further position to provide a view along another oblique rear line of sight, said post being urged by said spring to turn oppositely and restore the mirror to its original position when pressure on the post is released, said frame having an arm extending outwardly therefrom with a ball on a free end of said arm, said post having a ball on its other end, said first clamp unit including two plates adjustably engaging the balls on said post and said arm to constitute therewith said universal joint means.

6. A rear view mirror assembly for eliminating blind viewing areas at opposite sides of an automobile, comprising a frame, a mirror supported in said frame, a post, a first clamp unit including universal joint means adjustably connecting the frame to the post, a sleeve telescopically receiving said post, said post being rotatable and slidable in said sleeve and being frictionally engaged in the sleeve for remaining in any set position of extension and rotation in the sleeve, a second clamp unit attached to the sleeve for mounting the same in an axially vertical position at one side of the automobile, a magnet carried by said second clamp unit for detachable and adjustable engagement with a magnetic support at said one side of the automobile, whereby said mirror may be adjustably set in one position to provide a view along an oblique rear line of sight through a rear window at the other side of the automobile, said post having a flattened leg extending axially therefrom, and a fluted spring disposed circumferentially in said sleeve, said spring having alternate externally and internally convex flutes and being expansible in circumference, said leg having opposite rounded long edges frictionally engaged with two opposing externally convex flutes so that the post can be moved axially and can be manually rotated to turn in the sleeve, whereby the post can be manually rotated to engage with another two opposing flutes to hold the post in a new position of rotation and set the mirror in another position, and whereby the post can be manually rotated to turn the leg slightly in the sleeve to set the mirror in a further position to provide a view along another oblique rear line of sight, said post being urged by said spring to turn oppositely and restore the mirror to its original position when pressure on the post is released, said frame having an arm extending outwardly therefrom with a ball on a free end of said arm, said post having a ball on its other end, said first clamp unit including two plates adjustably engaging the balls on said post and said arm to constitute therewith said universal joint means, said frame being reflective all around the periphery of the mirror to glow when vehicles approach the automobile.

References Cited
UNITED STATES PATENTS

| | | | |
|---|---|---|---|
| 970,636 | 9/1910 | Miller | 248—481 X |
| 1,430,379 | 9/1922 | Hubbell | 248—481 X |
| 1,446,164 | 2/1923 | D'Eyrand | 248—481 |
| 1,806,059 | 5/1931 | Hoople | 248—483 X |
| 2,134,016 | 10/1938 | Zink | 248—276 |
| 2,261,301 | 11/1941 | Smith | 248—486 X |
| 2,435,728 | 2/1948 | Trowbridge | 248—481 X |
| 2,718,175 | 9/1955 | Gim | 350—289 |
| 2,915,944 | 12/1959 | Butts | 248—480 |
| 2,995,983 | 8/1961 | Davis | 248—480 |
| 3,187,628 | 6/1965 | Canns et al. | 350—97 X |

JEWELL H. PEDERSEN, *Primary Examiner.*

O. B. CHEW, *Assistant Examiner.*